United States Patent [19]
Schneider et al.

[11] Patent Number: 5,676,385
[45] Date of Patent: Oct. 14, 1997

[54] SEMI-AUTOMATIC VEHICLE LEVELING SYSTEM

[75] Inventors: Robert H. Schneider; Jon D. Jacobs, both of Beaver Dam, Wis.

[73] Assignee: Versa Technologies, Inc., Racine, Wis.

[21] Appl. No.: 273,307

[22] Filed: Jul. 11, 1994

Related U.S. Application Data

[63] Continuation-in-part of Ser. No. 97,107, Jul. 26, 1993, Pat. No. 5,628,521.

[51] Int. Cl.$^6$ ............................................. B60S 9/00
[52] U.S. Cl. .......................... 280/6.1; 208/6.12; 208/840
[58] Field of Search ............................ 280/840, 6.11, 280/6.12

[56] References Cited

U.S. PATENT DOCUMENTS

| | | |
|---|---|---|
| 3,404,899 | 10/1968 | Vogel . |
| 3,669,409 | 6/1972 | Eranosian . |
| 3,817,493 | 6/1974 | Hanser . |
| 3,885,813 | 5/1975 | Kern . |
| 3,901,532 | 8/1975 | Hornagold . |
| 4,044,999 | 8/1977 | Dodgen . |
| 4,053,073 | 10/1977 | Franchin . |
| 4,061,309 | 12/1977 | Hanser . |
| 4,067,543 | 1/1978 | Orth et al. . |
| 4,071,147 | 1/1978 | Hornagold . |
| 4,082,249 | 4/1978 | Valdespino et al. . |
| 4,084,830 | 4/1978 | Daniel, Jr. et al. . |
| 4,165,861 | 8/1979 | Hanser . |
| 4,174,094 | 11/1979 | Valdespino et al. . |
| 4,216,939 | 8/1980 | Valdespino . |
| 4,558,886 | 12/1985 | Straub . |
| 4,597,584 | 7/1986 | Hanser . |
| 4,641,843 | 2/1987 | Morrisroe, Jr. . |
| 4,678,041 | 7/1987 | Staudinger . |
| 4,743,037 | 5/1988 | Hanser . |
| 4,746,133 | 5/1988 | Hanser et al. . |
| 4,784,400 | 11/1988 | Hofius . |
| 4,815,711 | 3/1989 | Bruno et al. . |
| 4,865,295 | 9/1989 | Holloway . |
| 4,887,840 | 12/1989 | Harara et al. . |
| 4,974,861 | 12/1990 | Itoh et al. . |
| 5,013,011 | 5/1991 | Halloway . |
| 5,176,391 | 1/1993 | Schneider et al. . |
| 5,312,119 | 5/1994 | Schneider et al. . |

FOREIGN PATENT DOCUMENTS 222381  8/1958  Australia .

*Primary Examiner*—Eric D. Culbreth
*Attorney, Agent, or Firm*—Andrus, Sceales, Starke & Sawall

[57] ABSTRACT

A system for leveling a vehicle such as a recreational vehicle or the like includes three jacks in the form of hydraulic cylinders mounted to the vehicle frame. A series of manually actuated switches, oriented in a diamond pattern, are located within the interior of the vehicle and are interconnected with the jacks to provide selective extension of the jacks to adjust the attitude of the vehicle relative to level. A level sensor is mounted to the vehicle and is interconnected with the jacks and the switches, and an operating system is responsive to the level sensor for controlling operation of the jacks and providing information to the control panel. The operating system alerts the operator as to which of the switches should be actuated in order to level the vehicle, and also functions to cut-off extension of each jack when the level sensor has detected that the vehicle in the vicinity of the jack has attained a level condition. The system further includes a level indicator for providing a visual indication to the operator that the vehicle has attained a level condition.

7 Claims, 14 Drawing Sheets

SEMI-AUTOMATIC VEHICLE LEVELING SYSTEM

CROSS-REFERENCE TO RELATED APPLICATIONS

This application is a continuation-in-part of application Ser. No. 08/097,107 filed Jul. 26, 1993, now U.S. Pat. No. 5,628,521.

BACKGROUND AND SUMMARY

This invention relates to a leveling system for use with a vehicle, such as a recreational vehicle.

Various systems are known for leveling a vehicle such as a recreational vehicle. Some such systems are shown in U.S. Pat. Nos. 4,061,309; 4,165,861; 4,597,584; 4,743,037; and 4,746,133. These patents all show a leveling system having four jacks located one adjacent each corner of the vehicle. Schneider et al U.S. Pat. No. 5,176,391, owned by the same assignee as the present application, discloses a vehicle leveling system having three jacks, two of which are located at the rearward end of the vehicle and one of which is located at the forward end of the vehicle.

Generally, all of the above-noted patents disclose vehicle leveling systems which are relatively complex in construction and operation, to provide automatic leveling of the vehicle in response to certain operator commands.

It is an object of the present invention to provide a manually operated semi-automatic vehicle leveling system which is relatively simple in its components, installation and operation. A further object of the invention is to provide several features for use with a manually operated vehicle leveling system which enhance operation of the system and simplify the leveling process for the operator.

In accordance with one aspect of the invention, a vehicle leveling system includes a series of extendible and retractable jacks mounted to the frame of the vehicle, a manually operated actuator mechanism located within the vehicle interior, and a power system interposed between the jacks and the manually operated actuator mechanism for selectively extending and retracting the jacks. The series of jacks includes first and second jacks located toward one end of the vehicle and a third jack located toward the opposite end of the vehicle. The manually operated actuator mechanism includes a series of switches disposed in a diamond pattern relative to the longitudinal axis of the vehicle. The switches may be in the form of four manually actuated switches mounted to a panel located in the interior of the vehicle. In one form of the invention, a level sensing device is located in the vehicle interior to provide a visual indication to the operator of the attitude of the vehicle relative to level. In a semi-automatic form of the invention, a level sensing device is mounted to the frame of the vehicle and is interconnected between the switches and jacks to provide visual indications to the operator of which switches should be actuated to level the vehicle, and to output a signal when the vehicle has attained a level condition. Circuitry is interconnected between the level sensing device and the switches for controlling operation of the jacks and to cut-off movement of each jack when the vehicle has attained a level condition in the vicinity of the vehicle which is being raised or lowered by movement of the jack.

Each jack is preferably in the form of a hydraulic cylinder assembly including a cylinder and an extendible and retractable piston mounted to the cylinder. A spring is interposed between the cylinder and the piston. Introduction of pressurized fluid into the cylinder causes extension of the piston against the force of the spring, and the spring causes retraction of the piston when fluid pressure within the cylinder is relieved. A shoe is connected to the extendible and retractable piston, and the spring is preferably interconnected between the cylinder and the shoe. The power system is preferably a fluid power system consisting of a hydraulic fluid reservoir, a pump for selectively supplying fluid under pressure to the jacks from the reservoir, and a control valve interposed between the hydraulic fluid reservoir and each jack. Each control valve controls the supply of pressurized fluid to one or more of the jacks during operation of the pump, and also provides flow of fluid to the reservoir when the pump is not operating. The control valves are responsive to operation of the manually actuated switches for selectively adjusting the attitude of the vehicle relative to level in response to manual actuation by the operator. Each control valve is interconnected with a single return line interconnected with the reservoir, and a return control valve is disposed in the return line for controlling flow of fluid from the jacks to the reservoir. The return control valve is responsive to a manually operated retract switch actuable by the operator and located within the interior of the vehicle.

The invention further contemplates a unique jack construction for use in the vehicle leveling system of the invention. A plate is interconnected with the hydraulic cylinder of each jack toward the upper end of the cylinder. The spring is interconnected between the plate and the piston, preferably having its lower end mounted to the shoe to which the piston is connected. A connector arrangement is interposed between the spring and the plate for securing the spring to the plate. The connector arrangement is preferably in the form of a tapered passage provided in the upper end of the spring, which decreases in transverse dimension in a bottom-to-top direction, a plug having a tapered wall disposed within the tapered passage and engaging the spring, and a connector extending between the plate and the plug. The plate is mounted to the upper end of the cylinder so as to be selectively pivotable relative thereto. In this manner, the spring can be placed in any desired position relative to the vehicle frame once the cylinder is mounted to the frame in order to avoid any obstructions which may be present in the vicinity of the frame.

The invention further contemplates several features providing semi-automatic operation of the vehicle leveling system, to provide ease in operation of the system. A level sensor is mounted to the vehicle and is interconnected with the jacks and with the switches. An operating system is interposed between the jacks and the switches for moving the jacks in response to operation of the switches, and for cutting off movement of each jack in response to detection of a level condition of the vehicle, by the level sensor, in the vicinity of the vehicle in which each jack is operable to adjust the elevation of the vehicle. This assists the operator in operating the jacks to achieve a level condition for the vehicle. In addition, a signal arrangement is provided for alerting the operator as to which of the plurality of switches should be actuated to operate the jacks to adjust the elevation of the vehicle in order to level the vehicle. The signal arrangement is preferably in the form of a selectively illuminable visual indicator, such as an LED, located adjacent each of the switches. The visual indicator is illuminated to alert the operator that the adjacent switch should be actuated in order to level the vehicle. As can be appreciated, combination of the automatic cut-off feature and the visual indicator feature greatly assists the operator in manipulating the switches to level the vehicle. As a further added feature, the level sensor is capable of providing an output signal when the vehicle frame is at an angle relative to level which exceeds the adjustment capability of one or more of the jacks. A signal, such as a visual indication, is provided to the operator responsive to the signal to alert the operator of an excess slope condition. This saves the operator time by allowing the operator to move the vehicle on the terrain to a location which obviates the excess slope signal. In the past, an excess slope signal was only output when one or more of the jacks had been fully extended and the vehicle could not at that time be leveled. As an additional feature, the invention contemplates a latching retract or extend arrangement interconnected between the switches and the jacks. In either form, the latching feature allows the operator to press a single switch to begin extension or retraction of the jacks, and to then release engagement of the switch. The jacks continue to extend or retract to a desired position without engagement of the switch by the operator. In a latch retract mode, all jacks are fully retracted after initial engagement of the switch. In a latch extend mode, all jacks are extended until each jack engages the ground, after which extension is stopped in response to a predetermined threshold of hydraulic pressure in the hydraulic circuit, and the jacks are then operated individually to level the vehicle.

The above-noted semi-automatic features can be employed alone or in any combination, as desired, to enhance operation of the vehicle leveling system.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
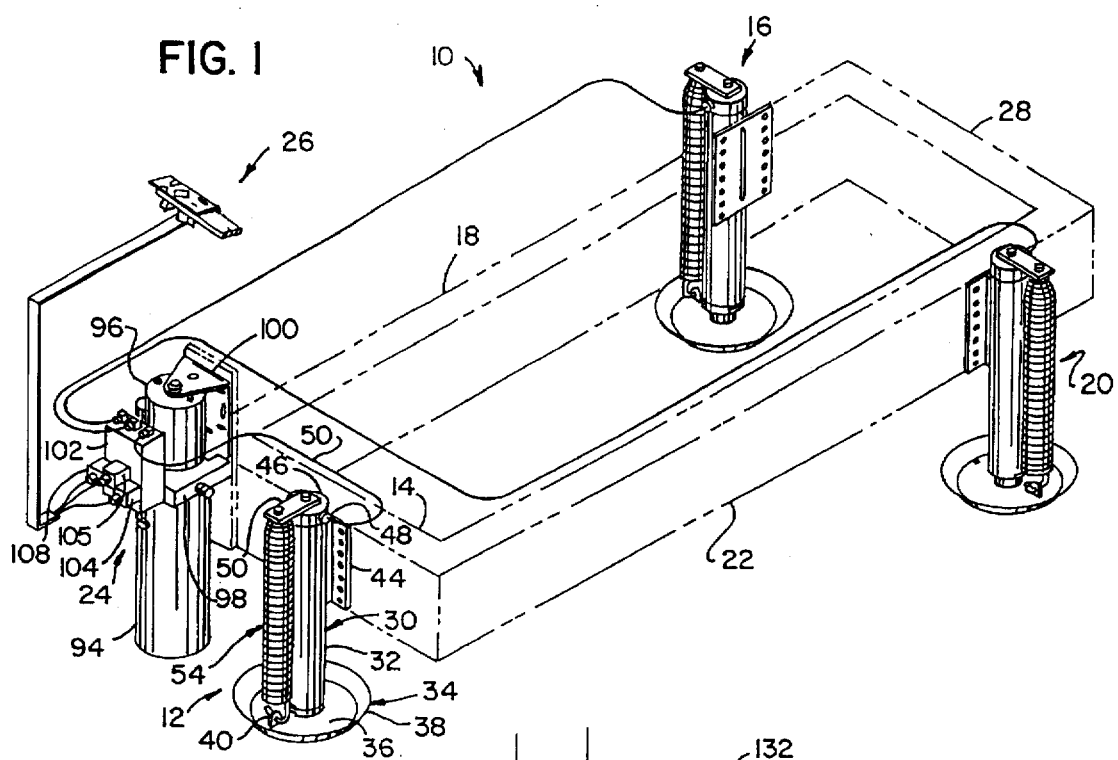
FIG. 1 is an isometric view of the vehicle leveling system constructed according to the invention as installed on the frame of a vehicle such as a recreational vehicle.

Referring to FIG. 1, a vehicle leveling system 10 constructed according to the invention is mounted on the frame members of a vehicle, such as a recreational vehicle or the like. System 10 includes a front jack assembly 12 mounted to the forward transverse frame member 14 of the vehicle, a passenger side rear jack assembly 16 mounted toward the rearward end of passenger side longitudinal frame member 18, a driver side rear jack assembly 20 mounted toward the rearward end of driver side longitudinal frame member 22, a reservoir, pump and actuator assembly 24 mounted to front transverse frame member 14, and a manually operated control panel 26 mounted within the interior of the vehicle. Rear jack assemblies 16, 20 are mounted just forwardly of a rear transverse frame member 28 which interconnects the rearward ends of longitudinal frame members 18, 22. Front jack assembly 12 is mounted approximately at the midpoint of front transverse frame member 14. This arrangement provides a stable three-point leveling system for adjusting the attitude of the vehicle relative to level.

Jack assemblies 12, 16 and 20 are identical in construction. The construction of jack assembly 12 will be explained in detail with reference to FIGS. 1–3, with the understanding that such explanation applies with equal force to jack assemblies 16, 20.

Figure 2:
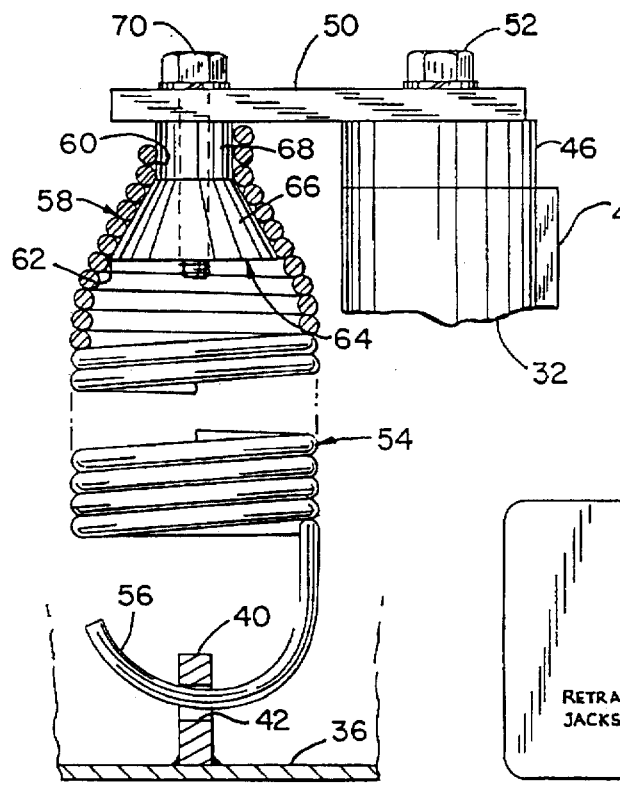
FIG. 2 is a partial side elevation view, with portions in section, showing the interconnection of the spring with the cylinder and shoe of each jack in the leveling system of FIG. 1.
Figure 3:
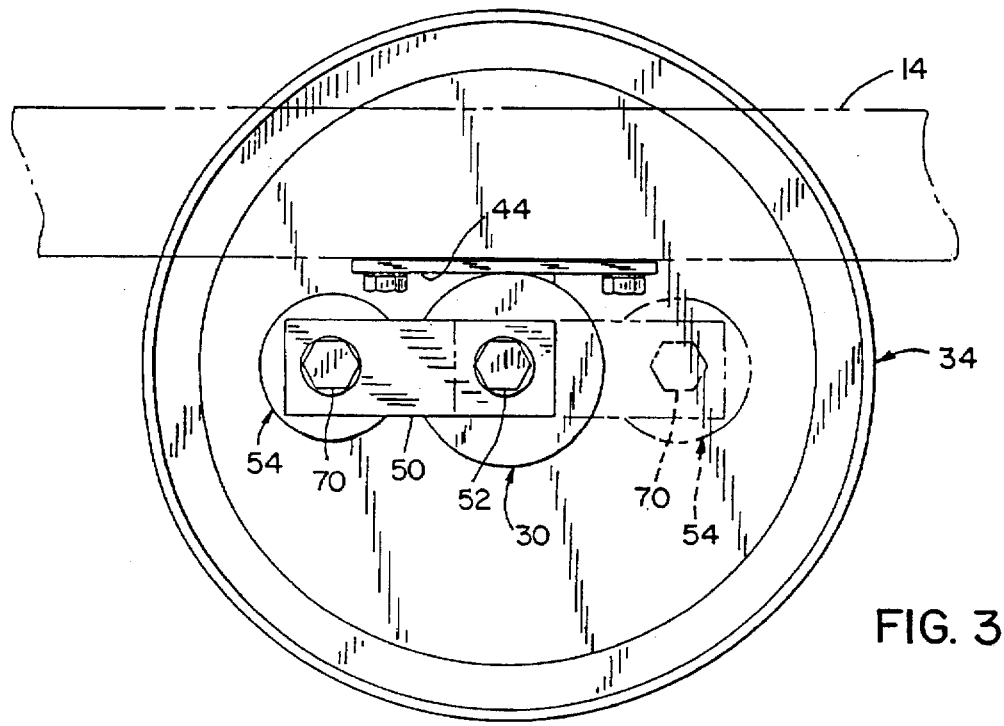
FIG. 3 is a top plan view of the jack of FIG. 2.

As shown in FIGS. 1–3, jack assembly 12 consists of a hydraulic cylinder assembly 30 including a cylinder 32 having a piston movably mounted within its interior. A piston rod (not shown) is mounted to the piston, and a shoe 34 is mounted to the end of the piston rod in a conventional manner. Shoe 34 includes a circular bottom wall 36 and an upstanding annular angled side wall 38. A tab 40 having an opening 42 (FIG. 2) is mounted to the upper surface of shoe bottom wall 36.

A mounting plate 44 is connected to the upper end of cylinder 32. Plate 44 is provided with a series of vertically spaced openings adjacent its side edges, which are adapted to receive bolts or the like to mount cylinder 32 to frame member 14.

Cylinder assembly 30 further includes a top cap 46 mounted to the upper end of cylinder 32 having a fitting 48 (FIG. 1) to which a hydraulic fluid line 50 is connected for selectively supplying pressurized fluid to cylinder 32 from reservoir, pump and actuator assembly 24 and for providing return flow of fluid from cylinder 32 to assembly 24. Cap 46 further includes a central, threaded vertical passage opening onto its top surface.

A mounting plate 50 is connected to cap 46 through a threaded connector 52 which extends through an opening formed toward one end of plate 51 and into threaded engagement with the threaded passage formed in cap 46.

A spring 54 extends between plate 51 and shoe 34. Spring 54 has a hook 56 at its lower end, which extends through opening 42 in tab 40 to secure the lower end of spring 54 to shoe 34. Spring 54 is formed so as to provide a tapered upper end section 58 defining an upwardly facing opening, a vertical passage 60 defined by the uppermost coils of spring 54, and a tapered passage 62 which extends between vertical passage 60 and the straight-sided vertical passage defined by the coils of spring 54 below tapered upper end section 58.

A plug member 64 is received within tapered upper end section 58 of spring 54. Plug member 64 includes a lower section defining a frustoconical outer surface 66 and a cylindrical upper section 68. A threaded passage extends along the longitudinal axis of plug member 64 between its upper and lower ends. A threaded connector 70 extends through an opening formed toward the outer end of plate 51 and into engagement with the threaded passage formed in plug member 64 for interconnecting tapered upper end section 58 of spring 54 with plate 51. Connector 70 is turned so as to draw the upper end of plug member 64 tight against the lower surface of plate 51 to assume its FIG. 2 position, to provide maximum pretensioning of spring 54. If desired to relieve the pretension of spring 54, connector 70 is turned in the opposite direction to move plug member 64 away from plate 51 under the influence of spring 54. Engagement of frustoconical outer surface 66 of plug member 54 with the coils of tapered upper end section 58 defining tapered passage 62 provides positive engagement between plug member 64 and spring 54. The uppermost coils of spring 54 defining vertical passage 60 further function to prevent relative movement between plug member 64 and spring 54 when plug member frustoconical surface 66 is engaged with the coils of spring 54 defining tapered passage 62.

If desired, connector 52 can be loosened to enable plate 51 to be pivoted relative to cylinder 32 throughout a range of movement of approximately 180°, as illustrated in FIG. 3, in order to allow cylinder 32 to be mounted to frame member 14 in any desired position. That is, the pivoting movement of plate 50 provided by connector 52 allows the installer to place spring 54 in any position between the range of positions illustrated in FIG. 3 in order to keep spring 54 out of the way of any obstructions which may be present on the undercarriage of the vehicle adjacent frame member 14.

Alternatively, jack assemblies 12, 16 and 20 may be constructed as illustrated in Schneider et al U.S. Pat. No. 5,100,105 issued Mar. 31, 1992 and assigned to the same assignee as the present application.

Figure 4:
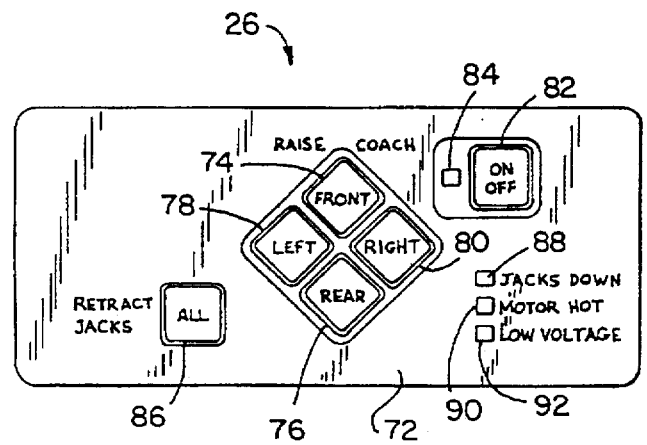
FIG. 4 is a view of the manually operated control panel for the leveling system of FIG. 1.

FIG. 4 illustrates control panel 26 in detail. Panel 26 includes a planar front wall 72 which is adapted to be mounted to the dashboard of the vehicle. A series of manually operable actuator switches are mounted to wall 72, including a front switch 74, a rear switch 76, a left switch 78 and a right switch 80. Switches 74, 76, 78 and 80 are arranged in a diamond pattern, and panel 26 is mounted to the vehicle such that the longitudinal axis of the diamond pattern formed by switches 74, 76, 78 and 80 is parallel to the longitudinal axis of the vehicle. In this manner, front switch 74 points toward the front of the vehicle, rear switch 76 points toward the rear of the vehicle, and left and right switches 75, 80 point toward the left and right sides, respectively, of the vehicle.

As an alternative to switches 74, 76, 78, and 80 it is understood that any other satisfactory manually operated actuator mechanism could be used, such as a joystick or the like.

Control panel 26 also includes a power ON/OFF switch 82 and an LED 84 adjacent thereto, and a RETRACT ALL JACKS switch 86. Panel 26 further includes a JACKS DOWN LED 88, a MOTOR HOT LED 90, and a LOW VOLTAGE LED 92.

Referring back to FIG. 1, reservoir, pump and actuator assembly 24 includes a hydraulic fluid reservoir 94 and a pump and motor assembly 96, both of which are mounted to a mounting block 98 disposed therebetween. A mounting bracket 100 is interconnected with pump and motor assembly 96 and block 98 for mounting reservoir, pump and actuator assembly 24 to frame member 14.

A valve block 102 is mounted to block 98, and a series of supply/return control valves 104, 106 and 108 are mounted to valve block 102. Supply/return control valves 104–108 are solenoid operated dual poppet bidirectional blocking valves, with a manual override, such as manufactured by Delta under its Part No. 86020151.

Figure 5:
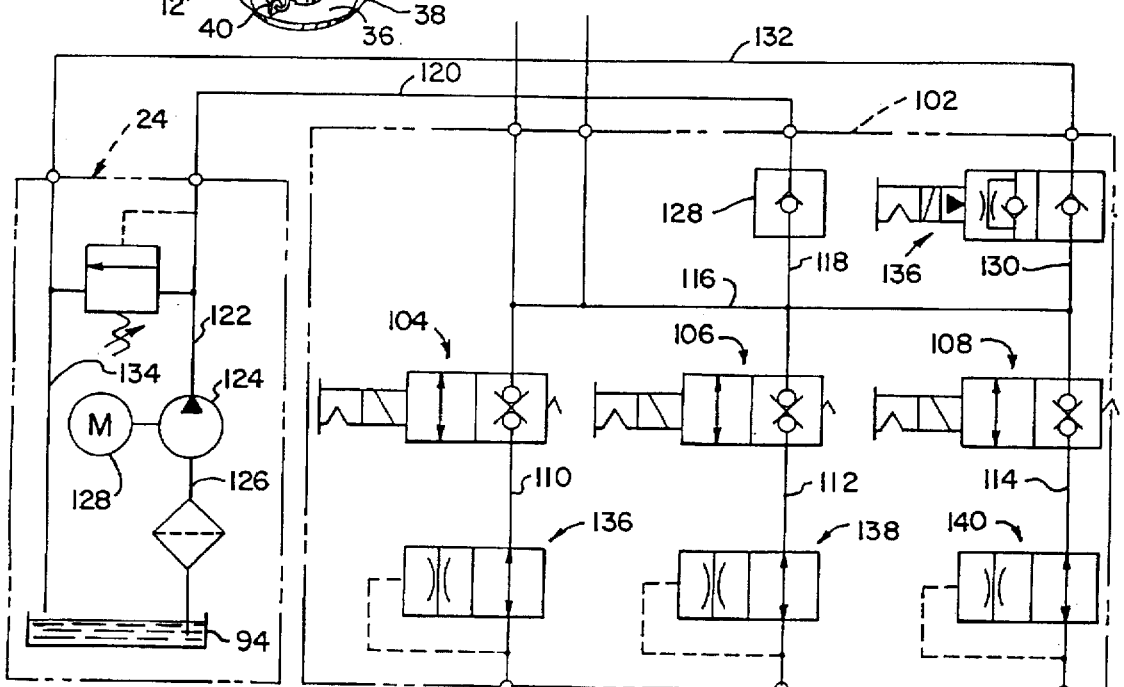
FIG. 5 is a schematic representation of the hydraulic fluid power system of the vehicle leveling system of FIG. 1.
Figure 5:
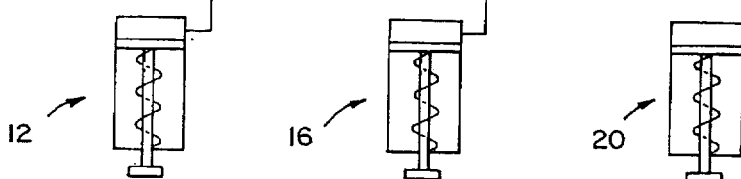

The hydraulic fluid power system for extending and retracting jacks 12, 16 and 20 as illustrated in FIG. 5 is substantially similar to the hydraulic system as shown in Schneider et al U.S. Pat. No. 5,176,391, owned by the same assignee as the present application, the disclosure of which is hereby incorporated by reference. Similarly, the construction of reservoir, pump and actuator assembly 24 is substantially identical to the reservoir, pump and actuator assembly as disclosed in Schneider et al U.S. Pat. No. 5,176,391, and reference is made to the description contained in U.S. Pat. No. 5,176,391 for a detailed explanation of the construction of reservoir, valve and actuator assembly 24.

Referring to FIG. 5, supply/return control valves 104, 106 and 108 are located in secondary supply/return passages 110, 112 and 114, respectively. Valves 104, 106 and 108 each include a rightward block having a double check valve and a leftward block providing free flow therethrough. Valves 104, 106 and 108 are biased toward their position shown in FIG. 5 in which their rightward blocks are located in passages 110, 112 and 114, respectively. In accordance with known construction, valves 104, 106 and 108 are shiftable leftwardly in response to supply of electrical current to a solenoid in response to operation of switches 74–80. In the event of an electrical failure, valves 104, 106 and 108 can be manually shifted between their rightward and leftward positions.

Secondary supply/return passages 110, 112 and 114 each communicate with a primary supply/return passage 116, which in turn communicates with reservoir 94 through a passage 118 and a line 120 extending between passage 118 and a line 122 interconnected with pump 124, which forms a part of motor and pump assembly 96 (FIG. 1). Pump 124 is interconnected with reservoir 94 through a line 126, and is driven by motor 128 which forms a further part of motor and pump assembly 96.

A check valve 129 is mounted within passage 118 for providing one-way flow of fluid from pump 124 through line 120 to primary supply/return passage 116.

A return passage 130 is formed in block 102, communicating between primary supply/return passage 116 and a line 132 which interconnects with a return line 134 to provide return flow of fluid to reservoir 94 from primary supply/return passage 116. A return control valve 136 is provided in passage 134 for controlling return flow of fluid from primary supply/return passage 116 to reservoir 94. Return control valve 136 is a two-way normally closed solenoid operated poppet valve, such as is sold by Delta under its Part No. 85002351. Return control valve 136 provides a rightward block having a check valve which prevents fluid flow from primary supply/return passage 116, and a leftward block having an oppositely oriented check valve which allows flow in return passage 130 from primary supply/return passage 116 to line 132. Return control valve 136 is biased to its FIG. 5 position in which its rightward block is disposed in return passage 130. The leftward block of return valve 136 provides an alternate flow path restricting arrangement, which in this application is not used.

A series of retraction restricting valves 136, 138 and 140 are located in passages 110, 112 and 114, respectively between jacks 12, 16, 20 and supply/return control valves 104, 106 and 108, respectively. Retraction restricting valves 136, 138 and 140 are generally constructed in accordance with the teachings of Schneider U.S. Pat. No. 4,704,947 entitled "Bidirectional Fluid Flow Valve", owned by the same assignee as the present application, and the disclosure of which is hereby incorporated by reference. Valves 136, 138 and 140 provide unrestricted flow in passages 110, 112 and 114, respectively, during supply of pressurized fluid from primary supply/return passage 116 to jacks 12, 16, 20, respectively, to extend jacks 12, 16, 20. On the other hand, when fluid pressure in primary supply/return passage 116 is relieved and flow control valves 104, 106 and 108 are shifted rightwardly to provide retraction of jacks 12, 16, 20, respectively, retraction restricting valves 136, 138 and 140 are shifted rightwardly to provide a restriction in the return flow of fluid from jacks 12, 16, 20, respectively to primary supply/return passage 116, until pressure on jacks 12, 16 and 20 is relieved to a predetermined extent. In this application, retraction restricting valve 136 is shifted to provide slow retraction of front jack 12 until the front vehicle wheels engage the ground and relieve pressure on jack 12. When this occurs, retraction restricting valve 12 is shifted to its FIG. 5 position to eliminate the restriction in flow through valve 136 and to provide full flow of fluid thereacross in secondary supply/return line 110, to provide faster traction of jack 12. In a similar manner, retraction restricting valves 138, 140 provide slow retraction of jacks 16, 20, respectively until the rear tire set adjacent each jack engages the ground, and thereafter fast retraction of jacks 16, 20.

Switches 74, 76, 78 and 80 are interconnected with valves 104, 106 and 108 to provide selective extension of jacks 12, 16 and 20, respectively in response to operation of switches 74, 76, 78 and 80. Front switch 74 controls extension of front jack 12; rear switch 76 controls extension of rear jacks 16, 20; left switch 78 controls extension of driver side rear jack 20; and right switch 80 controls operation of passenger side rear jack 16.

In operation, to level the vehicle the operator first actuates power ON/OFF switch 82 to energize the system, and LED 84 is illuminated to indicate that the system is energized. The operator then views a level indicator, such as a conventional carpenter's cross-check level or a bullseye level to determine the attitude of the vehicle relative to level. If the front of the vehicle needs to be raised, the operator actuates switch 74 to extend jack 12. Similarly, the operator operates switches 76, 78 and 80 to raise either the rear side, the passenger side or the left side, respectively, of the vehicle until the vehicle has moved to a level attitude. The operator then actuates power ON/OFF switch 82 to de-energize the system.

A float switch is provided in reservoir 94 to illuminate JACKS DOWN LED 88 when any one of jacks 12, 16 or 20 is extended. MOTOR HOT LED 90 is illuminated when motor 128 has run more than a predetermined period of time, which indicates that one or more of the jacks is fully extended and has not reached the ground. LOW VOLTAGE LED 92 is illuminated if the voltage operating motor 128 falls below a predetermined level, which indicates that the motor current is above a predetermined level in order to provide protection for current overload of motor 128.

RETRACT ALL JACKS switch 86 is actuated by the operator when it is desired to move the vehicle. Switch 86 is interconnected with retract control valve 136 for shifting valve 136 rightwardly, and for simultaneously shifting valves 104, 106 and 108 rightwardly, in order to provide retraction of jacks 12, 16 and 20 under the influence of the spring 54 of each jack.

As in the system disclosed in Schneider et al U.S. Pat. No. 5,176,391, the system of the present invention can only be operated when the transmission of the vehicle is engaged in its neutral or park conditions and when the parking brake is engaged. If any one of these conditions is violated, the electronics of the system automatically provide retraction of jacks 12, 16 and 20 in a manner similar to that disclosed in Schneider et al U.S. Pat. No. 5,176,391.

Figure 6:
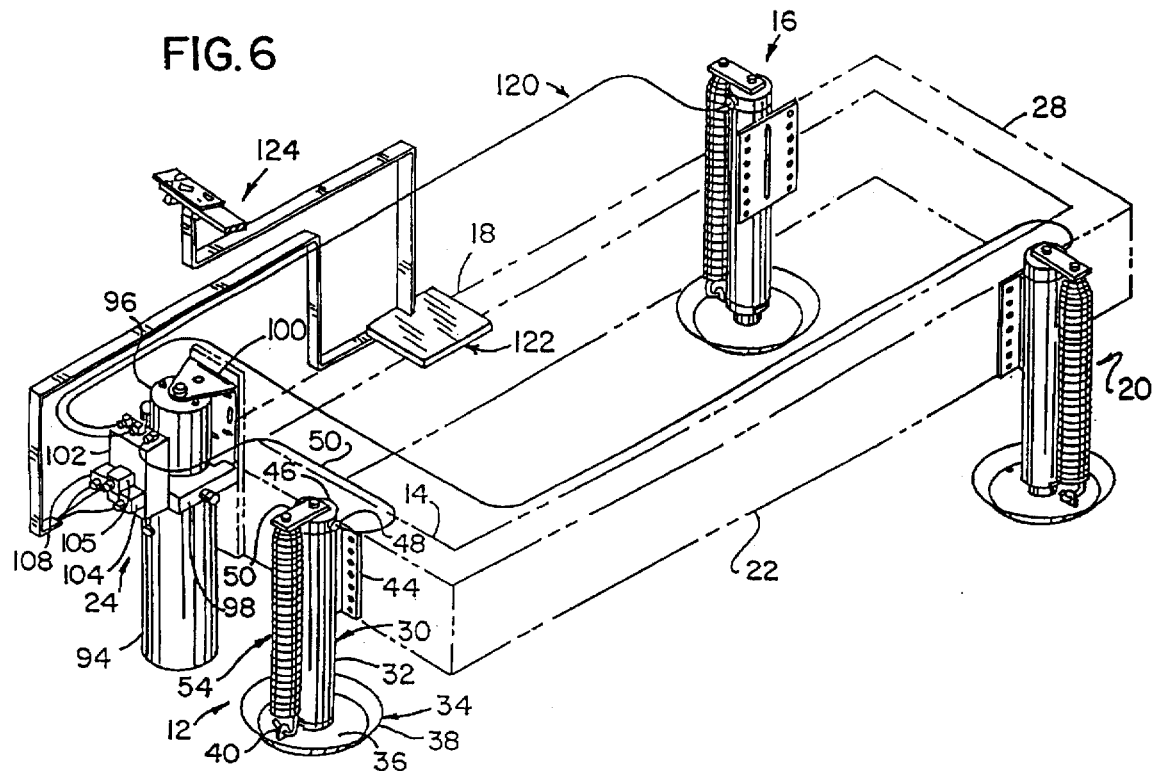
FIG. 6 is a view similar to FIG. 1 showing the semi-automatic leveling system of the invention.

FIG. 6 illustrates a semi-automatic vehicle leveling system 320 constructed according to the invention. System 320 utilizes jacks 12, 16, 20 and actuator assembly 24, all as described previously. System 320 includes a control box/level sensor 322, which may be mounted to the vehicle in any satisfactory location. As shown, control box/level sensor 322 is mounted to one of the frame members, such as 18. The level sensor component of control box/level sensor 322 is a dual axis clinometer, such as is available from Lucas Industries, Inc. of Reston, Virginia under its designation "ACCUSTAR", Part No. 02753-01. Control box/level sensor 322 is interposed between actuator assembly 24 and a control panel 324, mounted within the interior of the vehicle.

The level sensor component of control box/level sensor 322 provides an excess slope output signal when the level sensor is disposed at an angle relative to level which is greater than the angle of vehicle adjustment which can be accomplished by full extension of jacks 12, 16, 20.

Figure 7:
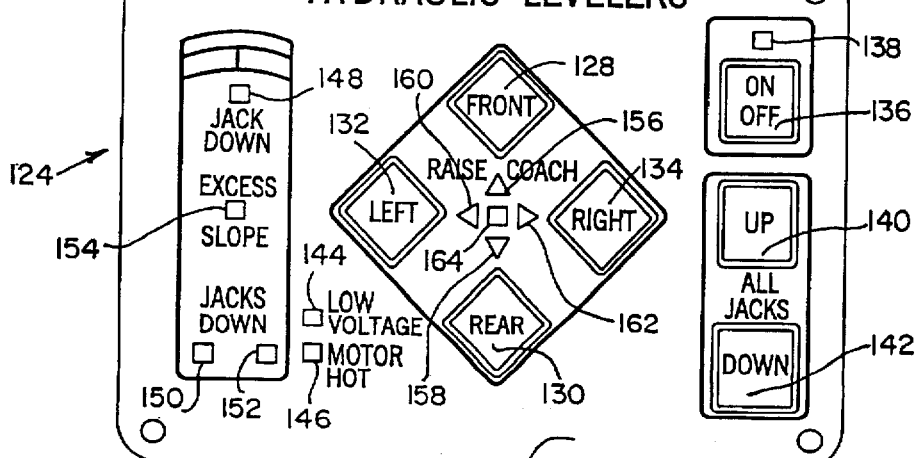
FIG. 7 is a view of a semi-automatic control panel for the leveling system of FIG. 6.

Control panel 324 is illustrated in FIG. 7. Control panel 324 includes a planar front wall 326 which is adapted to be mounted to the dashboard of the vehicle, or in any other satisfactory location. A series of manually operable actuator switches are mounted to wall 326, including a front switch 328, a rear switch 330, a left switch 332 and a right switch 334. Switches 328, 330, 332 and 334 are arrangement in a diamond pattern, and are preferably arranged such that the longitudinal axis of the vehicle is parallel to the longitudinal axis of the diamond pattern formed by switches 328, 330, 332 and 334, as set forth previously. It is understood that switches 328, 330, 332 and 334 could be replaced by any other satisfactory manually operated actuator mechanism, such as a joystick or the like.

Control panel 324 also includes an ON/OFF switch 336 and an LED 338 adjacent thereto. ALL JACKS UP and ALL JACKS DOWN switches 340, 342, respectively, are mounted adjacent ON/OFF switch 336. On the opposite side of switches 328, 330, 332 and 334, a LOW VOLTAGE LED 144 and a MOTOR HOT LED 146, respectively, are mounted to panel 326. A representation of the vehicle encloses a FRONT JACK DOWN LED 148, REAR JACKS DOWN LEDs 150, 152, and an EXCESS SLOPE LED 154. EXCESS SLOPE LED 154 is responsive to the excess slope output signal from control box/level sensor 322, to alert the operator of an excess slope condition.

In the center of the diamond pattern defined by jack actuator switches 328, 330, 332 and 334, a series of triangular level LEDs 156, 158, 160 and 162 are mounted adjacent actuator switches 328, 330, 332 and 334, respectively. A VEHICLE LEVEL LED 164 is located in the center of the pattern defined by LEDs 156, 158, 160 and 162.

Figure 8A:
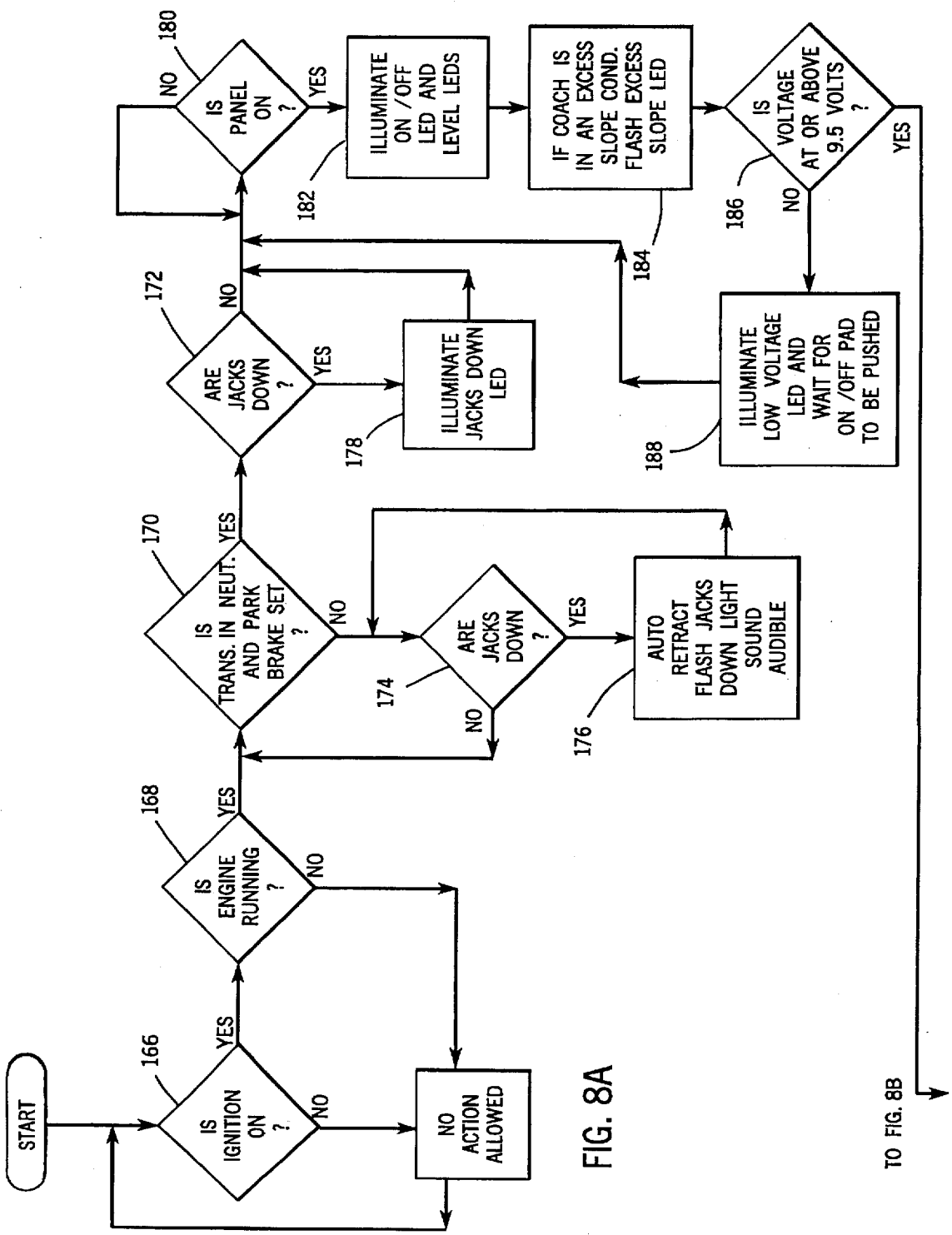
FIG. 8 is a flow chart illustrating the steps and operation of the leveling system of FIG. 7 responsive to operation of the control panel of FIG. 6.
Figure 8B:
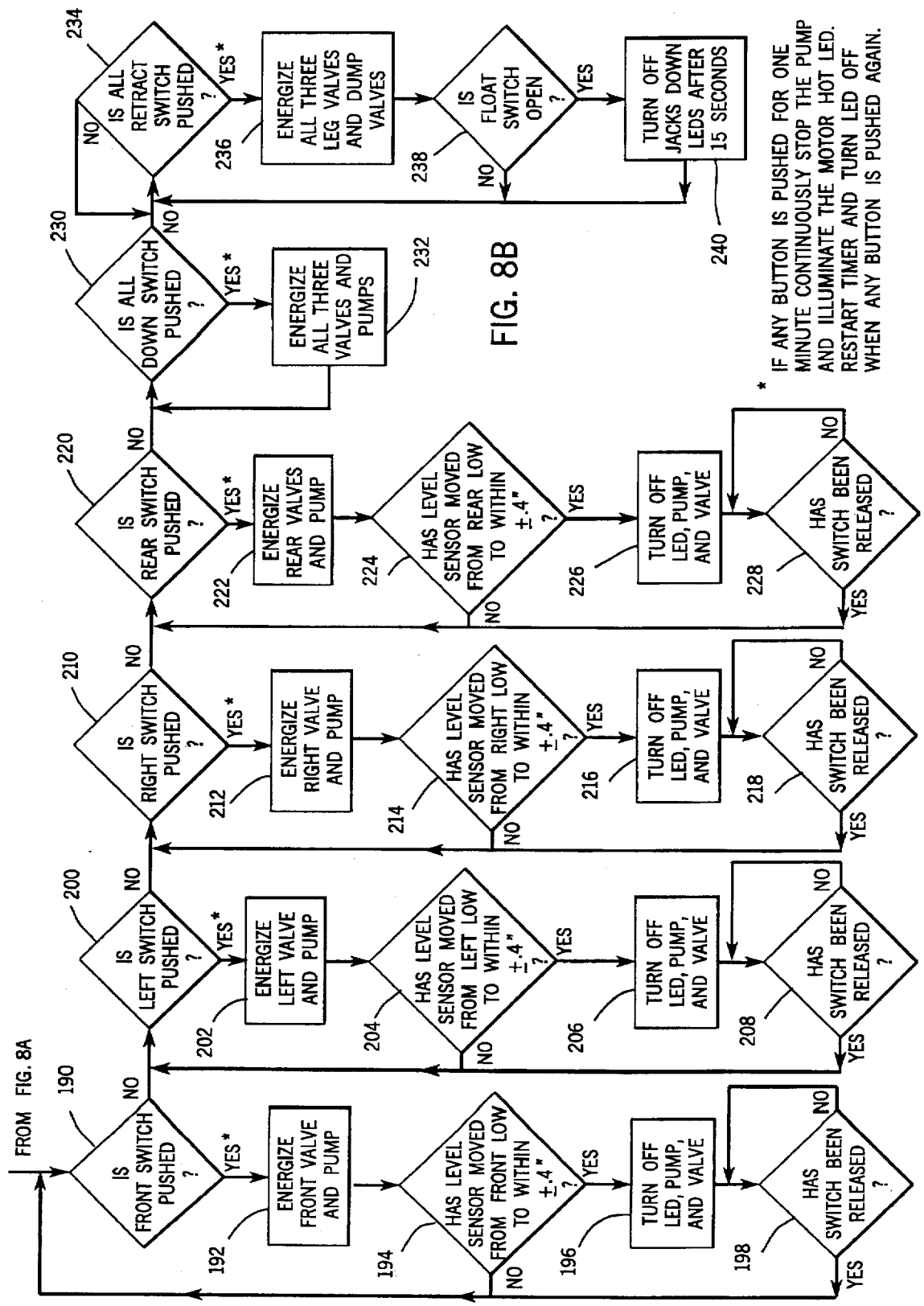

FIG. 8 illustrates the operating system programmed into the control box component of control box/level sensor 322, for controlling operation of jacks 12, 16 and 20 in response to actuation of switches 328, 330 and 332 and ALL JACKS UP and ALL JACKS DOWN switches 340, 342, and for controlling actuation of JACKS DOWN LEDs 148, 150 and 152 and EXCESS SLOPE LED 154.

As shown in FIG. 8, initial decision step 166 determines whether the vehicle ignition is in its "on" position. If not, no action on the part of the leveling system is allowed. If so, the system moves to decision step 168, at which it is determined whether the vehicle's engine is running. Again, no action is allowed if the engine is not running. If the engine is running, the system moves to decision step 170 to determine whether the vehicle's transmission is in its "neutral" position and whether the parking brake has been set. If so, the system moves to decision step 172 to determine whether any of jacks 12, 16 or 20 are not in their fully retracted position. If not, the system moves laterally to decision step 174 to determine whether any of jacks 12, 16, 20 are down. If not, the system returns to decision step 170. If so, the system moves to action step 176, and any of jacks 12, 16 or 20 which are down are automatically retracted and all LEDs 148, 150 and 152 are flashed. Simultaneously, an alarm is sounded to indicate that the jack or jacks are being retracted.

At decision step 172, with the vehicle's transmission in neutral and the parking brake set, it is again determined whether any of jacks 12, 16 or 20 are moved away from their fully retracted position. If so, all LEDs 148, 150 and 152 are illuminated at action step 178. If not, the system moves to decision step 180 to determine whether panel 324 has been turned on. If so, the system moves to action step 182 to illuminate ON/OFF LED 138 and any of level LEDs 156, 158, 160 and 162. Subsequently, the system moves to action step 184 to illuminate EXCESS SLOPE LED 154 if the vehicle is in an excess slope condition, as detected by control box/level sensor 122. The system then moves to decision step 186 and determines whether the voltage of the system is at or above a predetermined threshold, in this instance 9.5 volts. If not, the system moves to action step 188 to illuminate LOW VOLTAGE LED 144. In addition, LOW VOLTAGE LED 144 is extinguished by turning panel 324 off and then back on, and the system then returns to decision step 180.

From decision step 186, the system moves to decision step 190 to determine whether front switch 328 has been pushed. If so, the system moves to action step 192 to energize pump and motor assembly 96 and the front valve of valve block 102 to extend jack 12. The system then moves to decision step 194 to determine whether the level sensor component of control box/level sensor 332 has moved from a "front low" condition to within plus or minus 0.4° of level. If not, steps 190 and 192 are repeated until the condition of decision step 194 is met, and the system then moves to action step 196 to turn off FRONT LEVEL LED 156 and pump and motor assembly 96, and to close the front valve of valve block 102. From action step 196, the system moves to decision step 198 to determine whether front switch 328 has been released. If so, the system cycles back to decision step 190. If not, the system cycles back to decision step 198 until front switch 328 is released. Once the FRONT LEVEL LED 156 is no longer illuminated, front switch 328 is released by the operators, and the system will move on to decision step 200. At decision step 200, the system determines whether left switch 332 is pushed. If so, the system moves to action step 202 to energize the left valve of valve block 102 and pump and motor assembly 96 to extend jack 20, and then to decision step 204 to determine whether the level sensor component of control box/level sensor 332 has moved from left low to within plus or minus 0.4° of level. If not, the system continuously cycles back to decision step 200 until the condition of decision step 204 is met. The system then moves to action step 206 to turn off LEFT LEVEL LED 160, pump and motor assembly 96 and to close the left valve of valve block 102, and moves to decision step 208 to determine whether left switch 332 has been released. If so, the system cycles back to decision step 200. If not, the system cycles back to decision step 208 until left switch 332 is released. Once LEFT LEVEL LED 160 is no longer illuminated, left switch 332 is released by the operator, and the system will move on to decision step 210 to determine whether right switch 334 is pushed. If so, at action step 212 the system energizes the right valve of valve block 102 and pump and motor assembly 96 to extend jack 16, and moves on to decision step 214 to determine whether the right level sensor has moved from right low to within plus or minus 0.4° of level. Again, if not the system continues to cycle back to decision step 210 until the condition of decision step 214 is met, and the system then moves to action step 216 to turn off RIGHT LEVEL LED 162 and pump and motor assembly 96 and to close the right valve of valve block 102. The system then determines at decision step 218 whether right switch 334 has been released and, if so, cycles back to decision step 210. If not, the system cycles back to decision step 218 until right switch 334 is released. Again, once RIGHT LEVEL LED 162 is no longer illuminated, the operator will release right switch 334 and the system moves on to decision step 220 to determine whether rear switch 330 has been pushed. If so, the system moves to action step 222 to energize the rear valves of valve block 102 and pump and motor assembly 96, to extend jacks 16, 20. The system then moves to decision step 224 to determine whether the level sensor component of control box/level sensor 322 has moved from a rear low condition to within plus or minus 0.4° of level. If so, the system moves to action step 226 to turn off REAR LEVEL LED 158, pump and motor assembly 102 and to close the rear valves of valve block 102. The system then moves to decision step 228 to determine whether rear switch 330 has been released. If so, the system cycles back to decision step 220 to determine whether rear switch 330 has been pushed. If not, the system cycles back to decision step 228 until rear switch 330 is released. In most circumstances, the vehicle will then be level and the operator pushes ON/OFF switch 336 to de-energize the system. The system then illuminates VEHICLE LEVEL LED 162 to let the operator know that the vehicle is level.

It should be appreciated that, at any of decision steps 190, 200, 210 and 220, the operator can actuate any of switches 328, 330, 332 and 334 after a level condition for that particular switch has been attained, to further adjust the angle of the vehicle as desired.

Subsequent to decision step 220, the system moves to decision step 230 to determine whether ALL JACKS DOWN switch 342 has been pushed. If so, the system moves to action step 232 to energize pump and motor assembly 96 and all valves of valve block 102. It should be appreciated that this step only occurs after the vehicle has been parked and prior to leveling of the vehicle at steps 190, 200, 210 and 220, to initially engage jacks 12, 16 and 20 with the ground. Once all jacks are engaged with the ground as sensed by the operator, further extension of the jacks is permitted by switches 328, 330, 332, 334 and 342.

As a final step, the system determines at decision step 234 whether ALL JACKS UP switch 340 has been pushed. If so, all three leg valves and the dump valve are energized at action step 236, to enable the springs associated with jacks 12, 16 and 20 to retract the jacks by expelling hydraulic fluid from the interior of each jack. The system then moves to decision step 238 to determine whether a float switch located within the system's hydraulic fluid reservoir is open. If so, the JACKS DOWN LEDs 148, 150 and 152 are turned off after a time lapse of 15 seconds. If not, the system cycles back to decision step 234 to maintain jack retraction until the condition of decision step 238 is met.

The system can easily be modified to provide a latching retraction for jacks 12, 16 and 20 by retracting jacks 12, 16 and 20 by the operator pressing ALL JACKS UP switch 340 once and then releasing switch 340, with the appropriate valves of valve block 102 being held open until all jacks are retracted.

The software for carrying out the operating system of FIG. 8 according to the above description is believed to be well within the ability of a person of ordinary skill in the art.

Figure 9A:
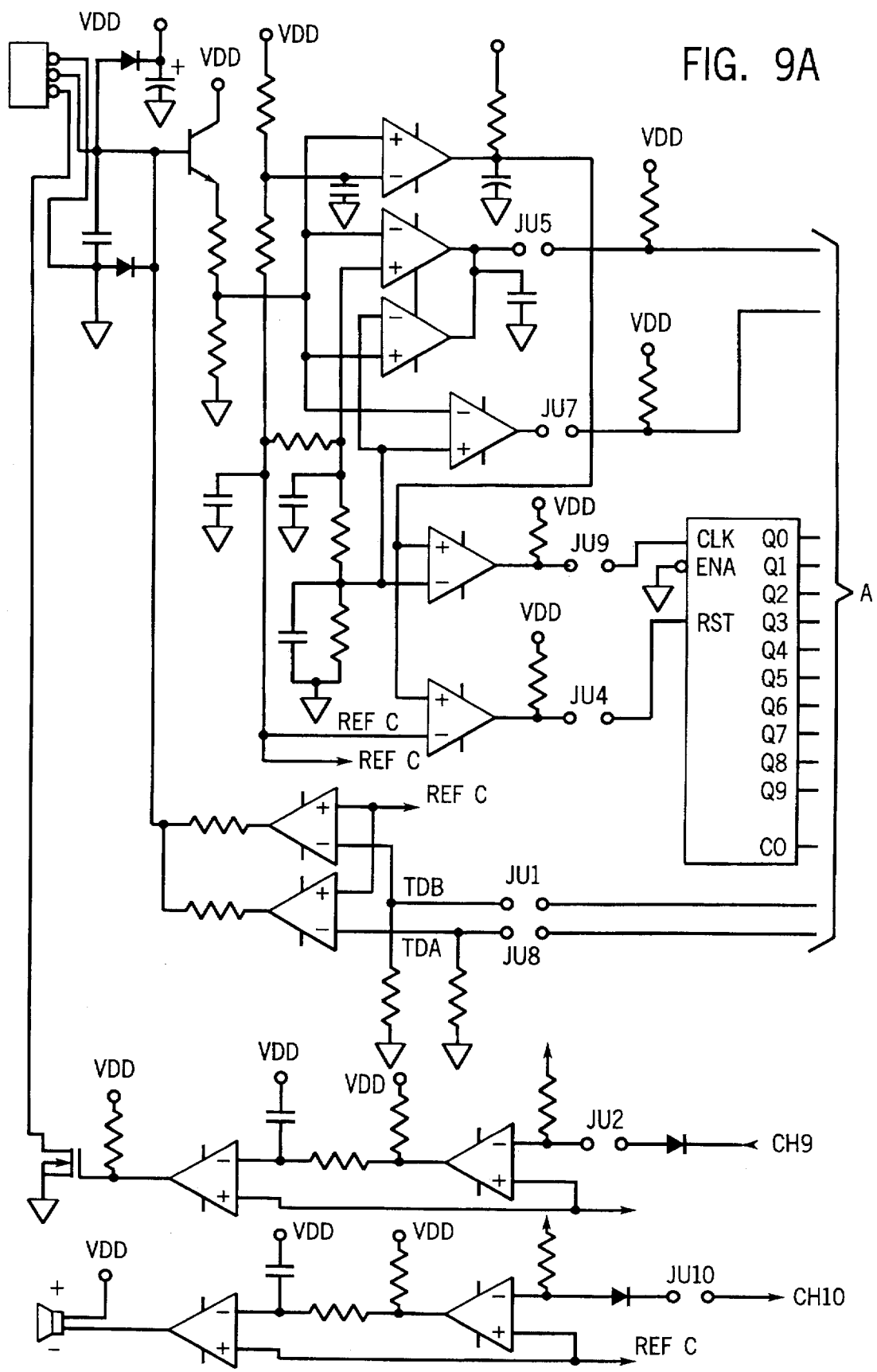
FIGS. 9A and 9B are a circuit diagram of the switch panel for use with the vehicle leveling system of FIG. 1.
Figure 9B:
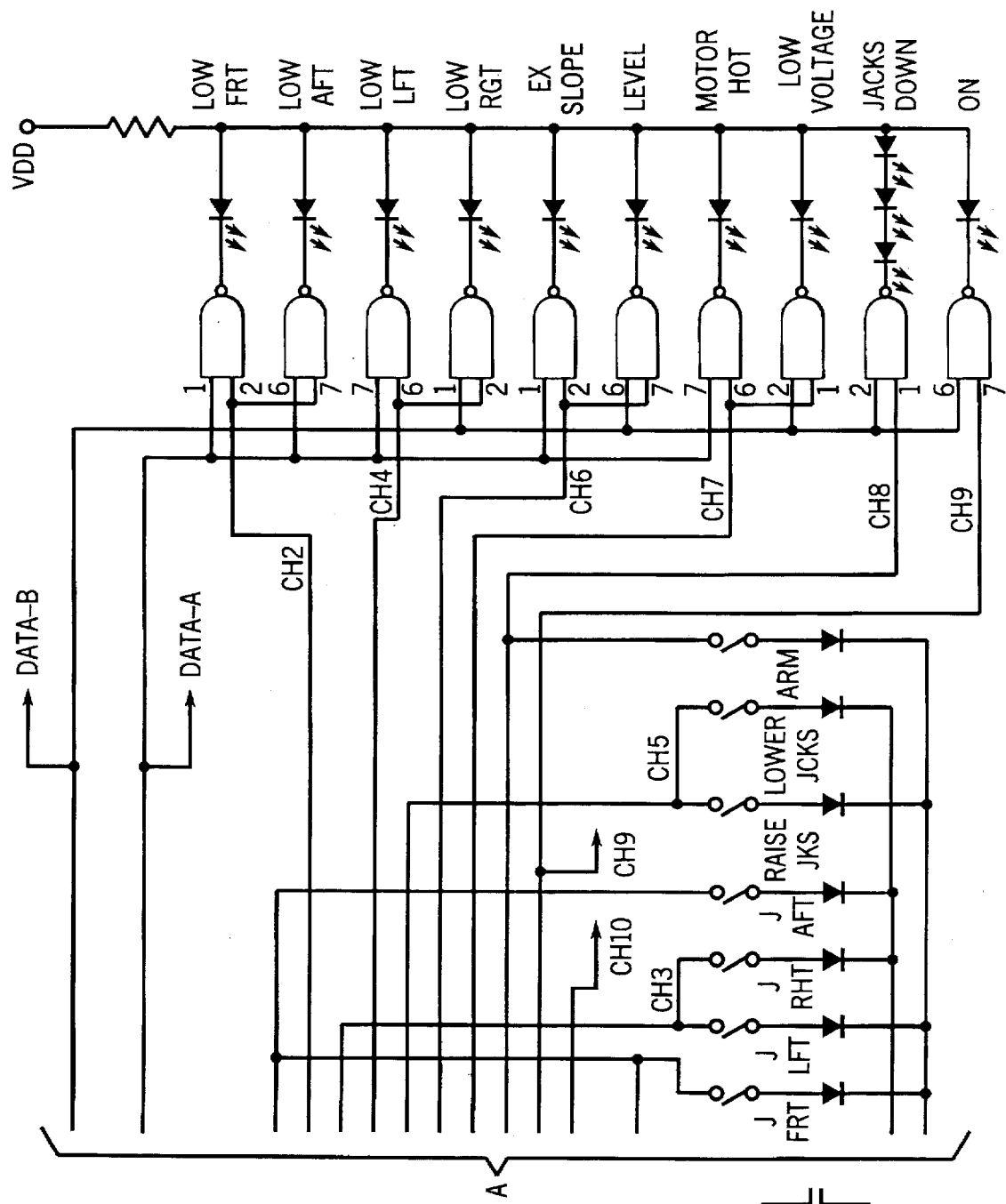
Figure 9B:
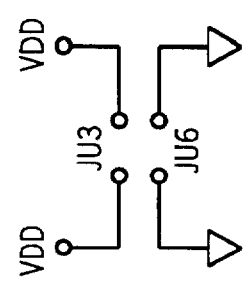
Figure 9B:
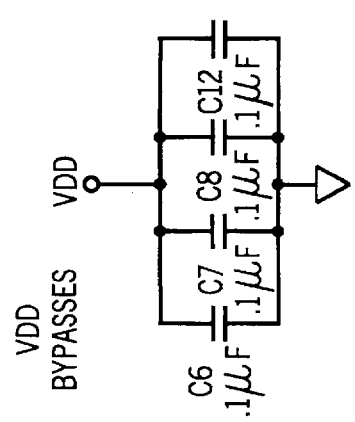
Figure 10A:
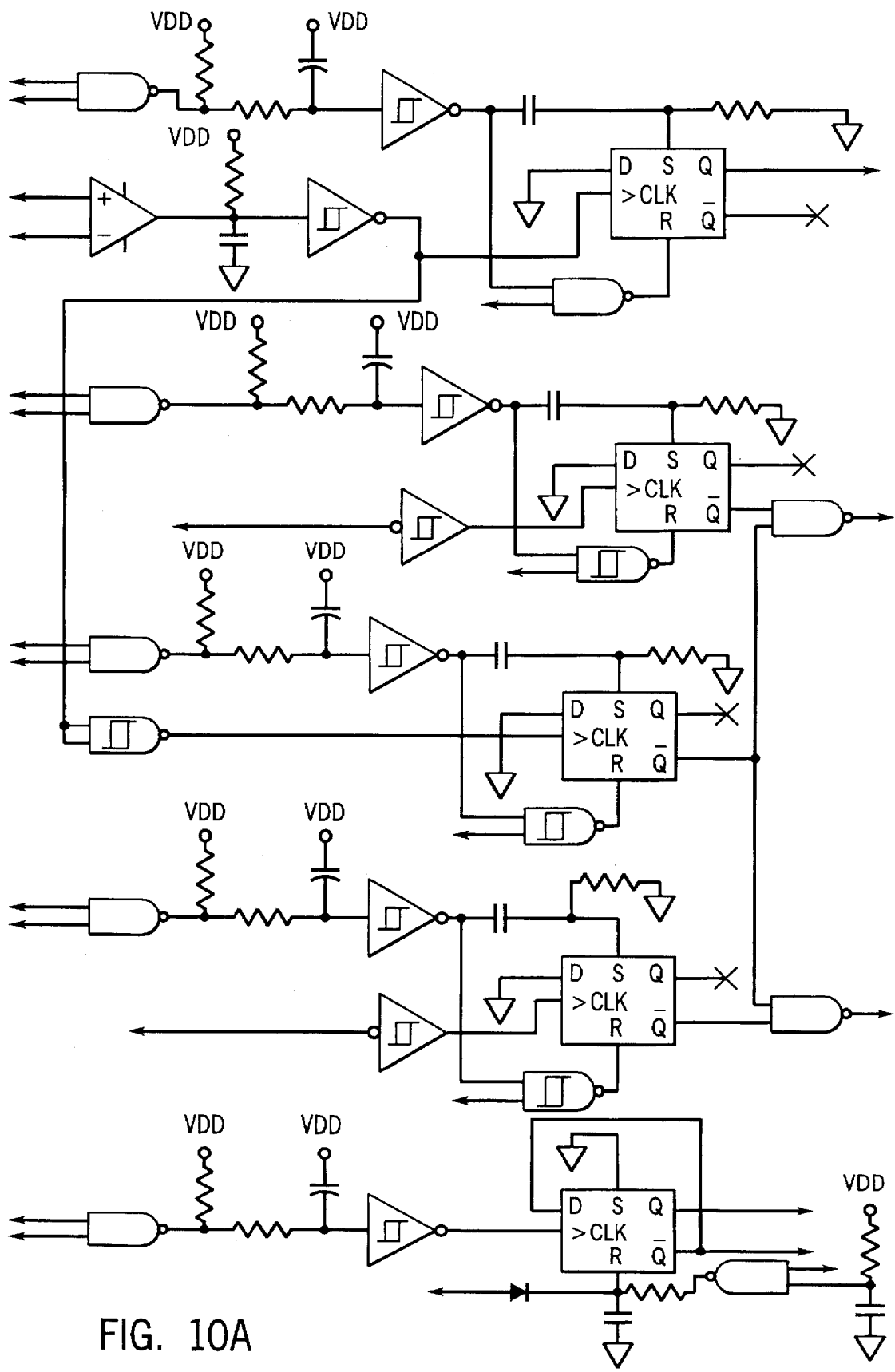
FIGS. 10A–10H are a circuit diagram of the control box and level sensor components of the vehicle leveling system of FIG. 1.
Figure 10B:
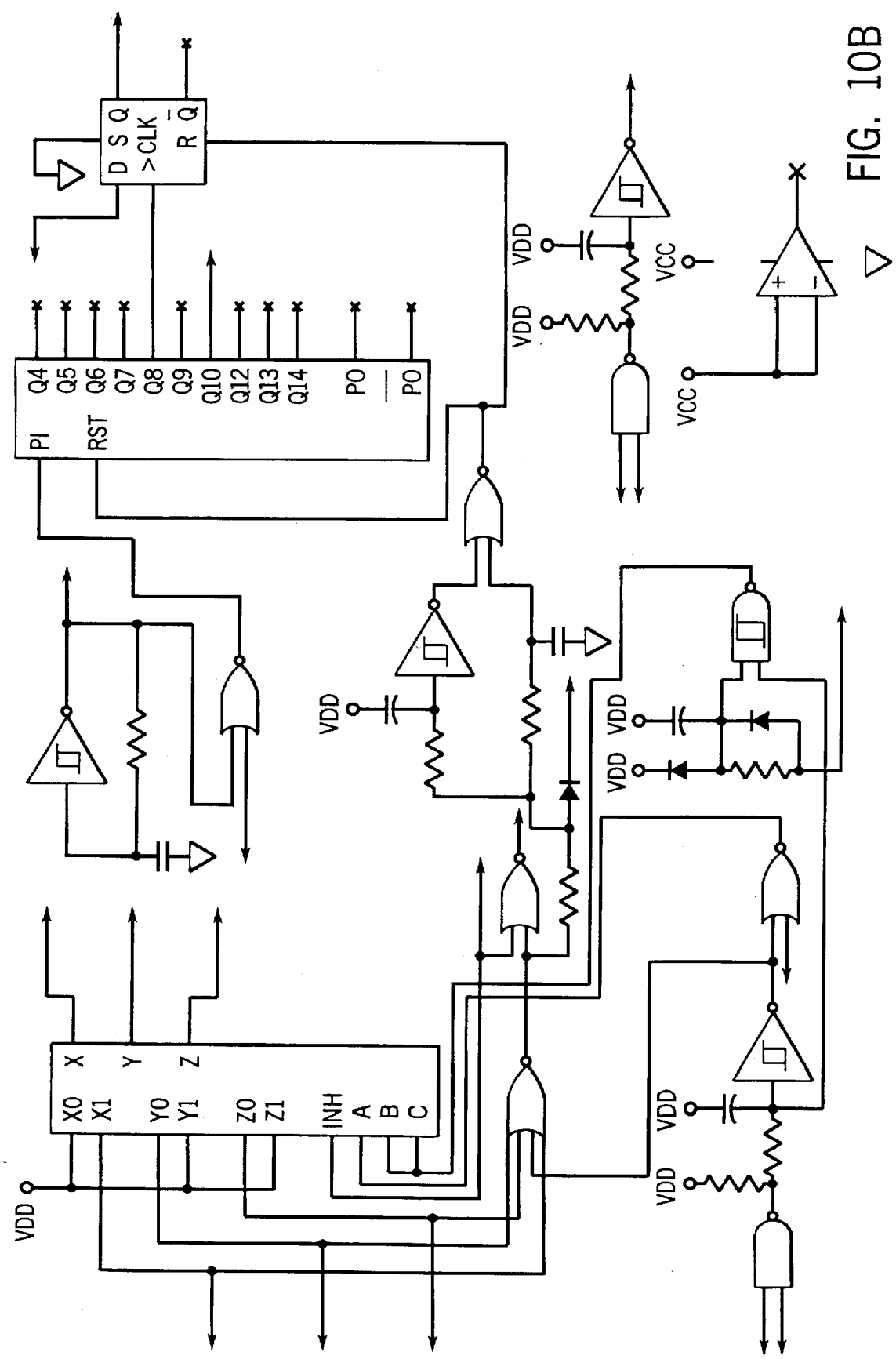
Figures 10C, 10D:
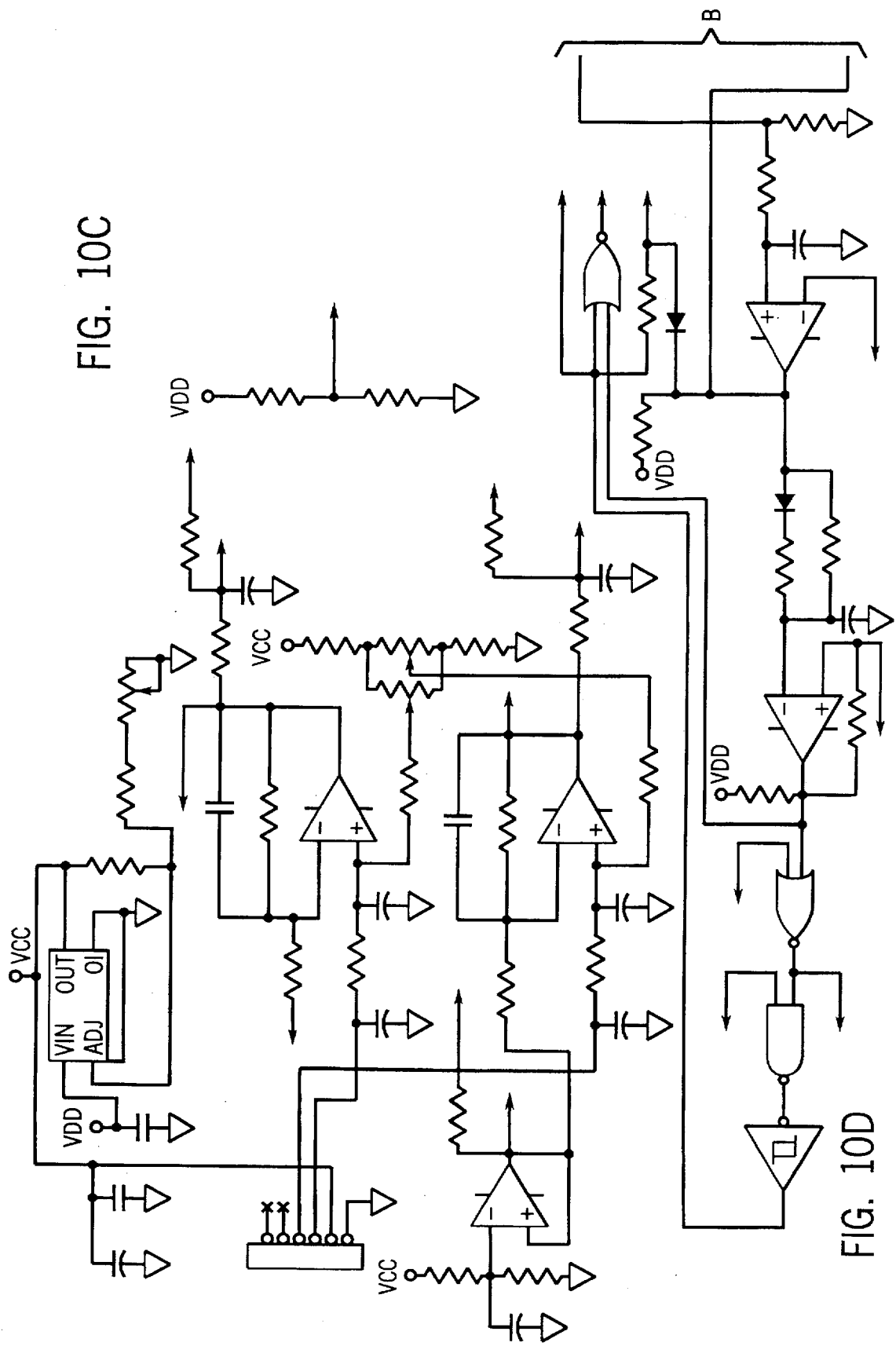
Figure 10E:
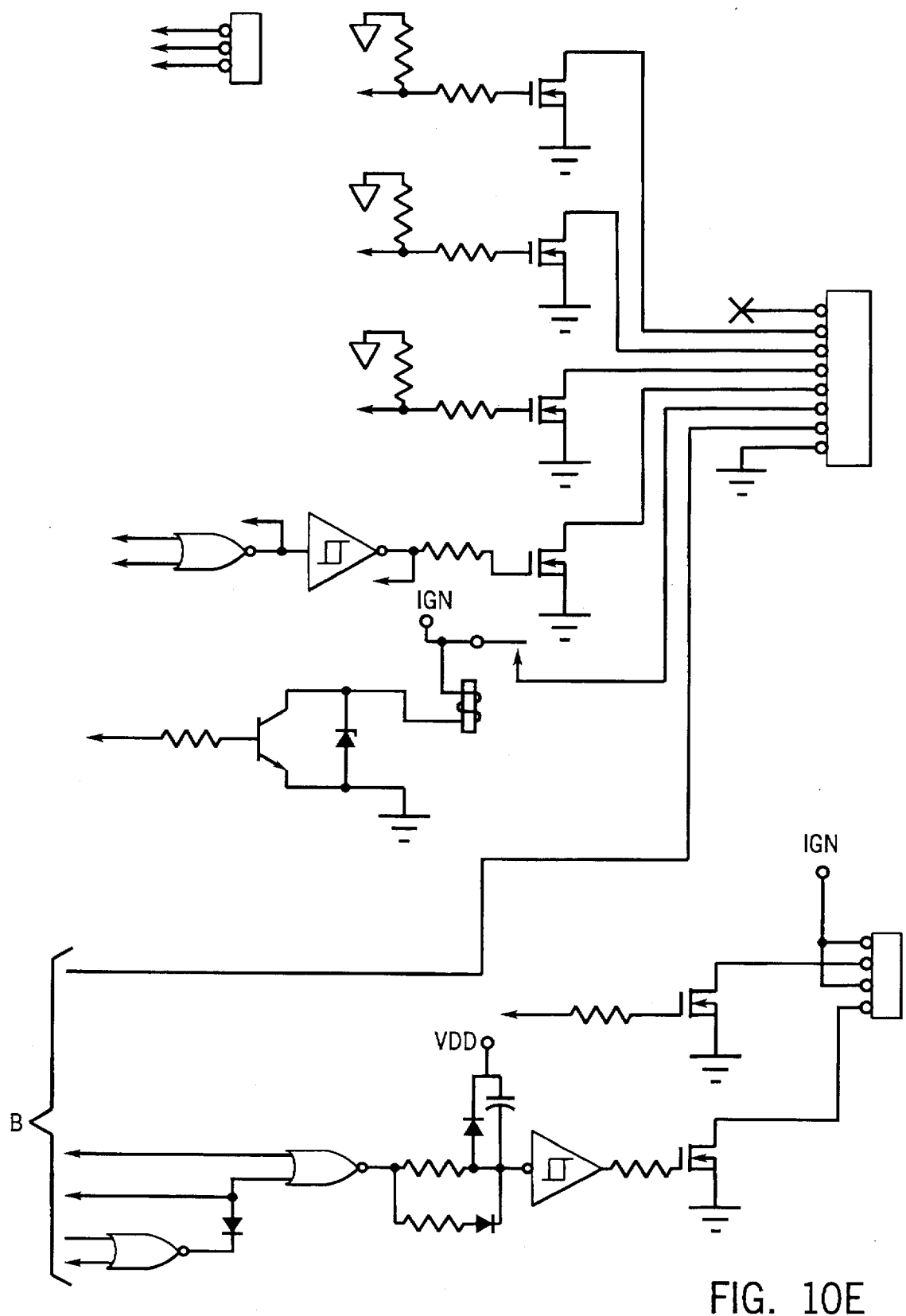
Figure 10F:
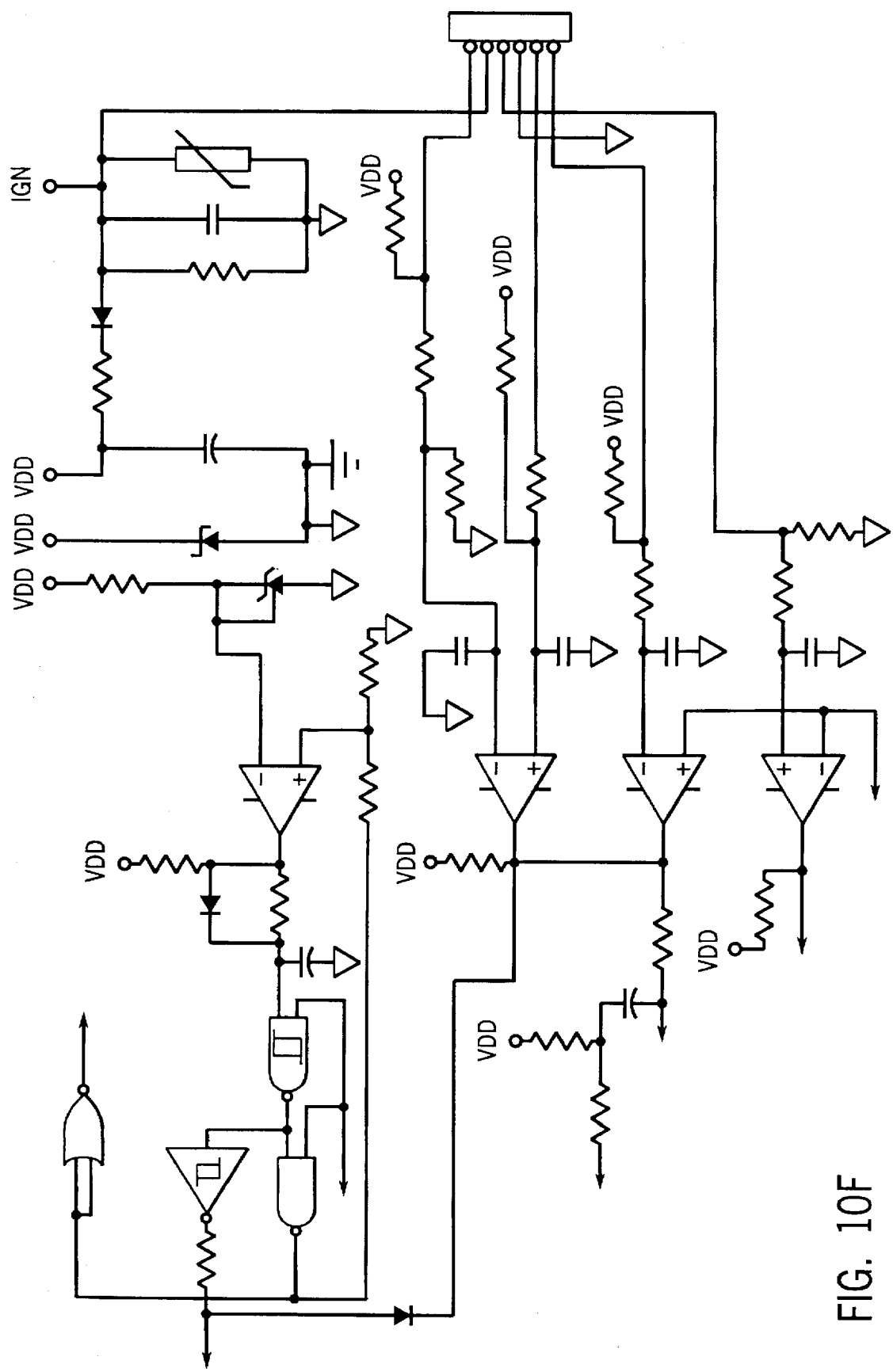
Figure 10G:
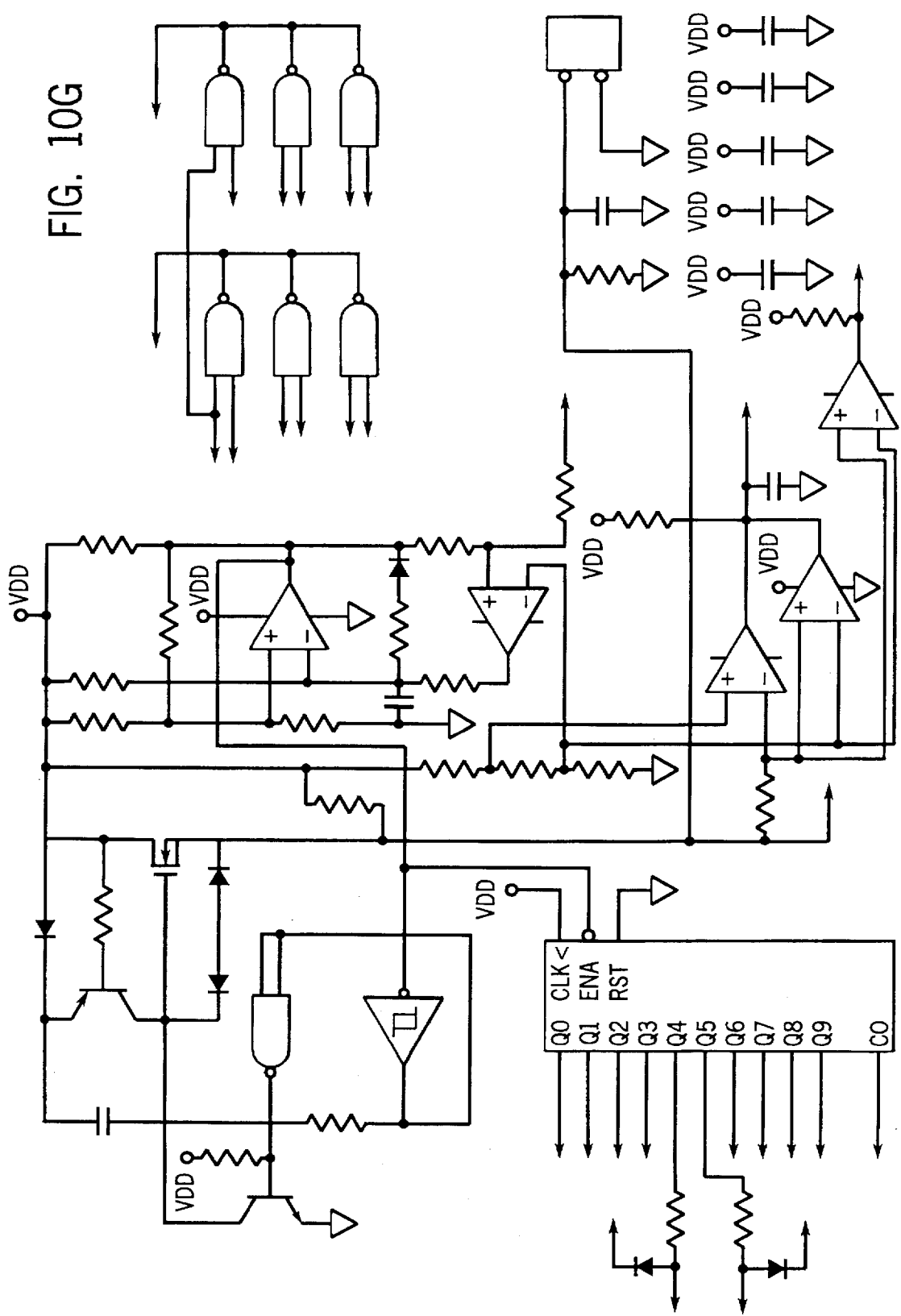
Figure 10H:
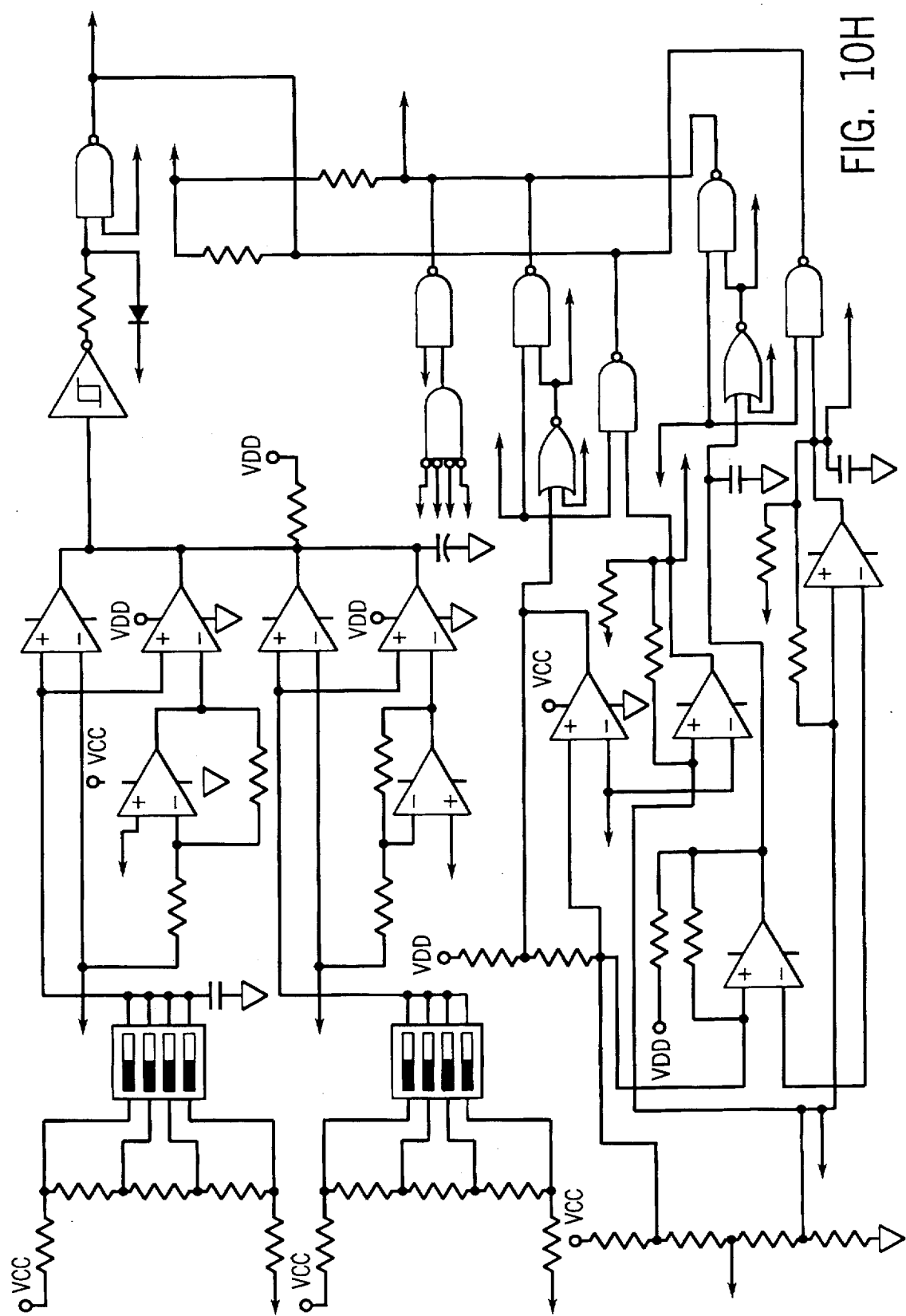

Additionally, FIGS. 10A-10H illustrate the electronic circuitry B incorporated into control box/level sensor 322 and FIGS. 9A and 9B illustrate the electronic circuitry A incorporated into switch panel 324, which embodies the best mode presently known of carrying out the invention. The components shown in FIGS. 9A and 9B and FIGS. 10A-10H, and their interconnection and operation, are apparent to one skilled in the art.

It can thus be appreciated that the leveling system of FIGS. 6-8 adds several features to the manually operated system of FIGS. 1-5 which enhance system operation to make it easier for the operator to level the vehicle. These features could be employed separately from each other or in combination, as set forth above.

Various alternatives and embodiments are contemplated as being within the scope of the following claims particularly pointing out and distinctly claiming the subject matter regarded as the invention.

We claim:

1. A vehicle leveling system, comprising:
a plurality of extendible and retractable jacks mounted to the vehicle;
a plurality of manually actuable switches operatively interconnected with the jacks for selectively extending and retracting the jacks to adjust the elevation of the vehicle;
a level sensor mounted to the vehicle and interconnected with the jacks and with the switches; and
an operating system for moving at least one of the jacks in response to actuation of each of the switches, wherein the operating system interconnects each switch with at least one of the jacks so as to provide operation of the at least one jack to adjust the attitude of the vehicle relative to level in a predetermined levelling direction independent of the remaining switches, wherein the operating system cuts off movement of the at least one jack in response to detection of a level condition of the vehicle in the predetermined levelling direction in which the at least one jack is operable to adjust the attitude of the vehicle relative to level.

2. The system of claim 1, further comprising a signal for alerting the operator as to which of the plurality of switches to actuate to operate at least one of the jacks to adjust the attitude of the vehicle relative to level in a predetermined levelling direction.

3. The system of claim 2, wherein the signal comprises a selectively illuminable visual indicator adjacent each switch for alerting the operator whether to actuate the switch.

4. The system of claim 1, further comprising a vehicle level indicator for indicating when the overall attitude of the vehicle relative to level has attained a level condition responsive to operation of the jacks.

5. The system of claim 4, wherein the level indicator comprises a selectively illuminable visual indicator located adjacent the plurality of switches and interconnected with the level sensor.

6. A method of adjusting the elevation of a vehicle, wherein a plurality of extendible and retractable jacks are mounted to the vehicle and wherein the jacks are movable in response to operation of a plurality of manually operable switches, comprising the steps of:
moving at least one of the jacks to adjust the attitude of the vehicle relative to level in a first predetermined levelling direction by operating a first one of the switches;
detecting a level condition of the vehicle in the first levelling direction; and
automatically stopping movement of the at least one jack in response to detection of a level condition of the vehicle in the first levelling direction.

7. The method of claim 6, further comprising the steps of sequentially operating additional ones of the switches to move additional ones of the jacks to adjust the attitude of the vehicle relative to level in additional predetermined levelling directions and, for each adjustment in the attitude of the vehicle relative to level in each predetermined levelling direction, detecting a level condition of the vehicle in the predetermined levelling direction and automatically stopping movement of the jacks in response thereto.

* * * * *